(12) United States Patent
Wilde et al.

(10) Patent No.: US 8,756,197 B1
(45) Date of Patent: Jun. 17, 2014

(54) GENERATING DATA SET VIEWS FOR BACKUP RESTORATION

(75) Inventors: Robert Wilde, St. Michael, MN (US); Larry Schiefelbein, Forest Lake, MN (US)

(73) Assignee: Symantec Corporation, Mountain View, CA (US)

( * ) Notice: Subject to any disclaimer, the term of this patent is extended or adjusted under 35 U.S.C. 154(b) by 404 days.

(21) Appl. No.: 12/856,557

(22) Filed: Aug. 13, 2010

(51) Int. Cl.
*G06F 17/00* (2006.01)
*G06F 17/30* (2006.01)

(52) U.S. Cl.
CPC ............. *G06F 17/00* (2013.01); *G06F 17/30* (2013.01)
USPC ........... 707/640; 707/610; 707/688; 707/791; 707/802

(58) Field of Classification Search
CPC ............................... G06F 17/30; G06F 17/00
USPC .................................................. 707/600–899
See application file for complete search history.

(56) References Cited

U.S. PATENT DOCUMENTS

| | | | |
|---|---|---|---|
| 5,561,421 A | 10/1996 | Smith | |
| 5,990,810 A | 11/1999 | Williams | |
| 6,014,676 A | 1/2000 | McClain | |
| 6,141,784 A | 10/2000 | Davis | |
| 6,389,433 B1 | 5/2002 | Bolosky et al. | |
| 6,513,051 B1 | 1/2003 | Bolosky et al. | |
| 6,785,786 B1 | 8/2004 | Gold et al. | |
| 6,865,655 B1 | 3/2005 | Andersen | |
| 6,920,537 B2 | 7/2005 | Ofek et al. | |
| 6,983,365 B1 | 1/2006 | Douceur et al. | |
| 7,055,008 B2 | 5/2006 | Niles | |
| 7,136,976 B2 | 11/2006 | Saika | |
| 7,146,429 B2 | 12/2006 | Michel | |
| 7,200,604 B2 | 4/2007 | Forman et al. | |
| 7,213,158 B2 | 5/2007 | Bantz et al. | |
| 7,257,104 B2 | 8/2007 | Shitama | |
| 7,257,643 B2 | 8/2007 | Mathew | |
| 7,310,644 B2 | 12/2007 | Adya et al. | |
| 7,318,072 B2 | 1/2008 | Margolus | |
| 7,359,920 B1 | 4/2008 | Rybicki et al. | |
| 7,389,394 B1 | 6/2008 | Karr | |
| 7,401,194 B2 | 7/2008 | Jewell | |

(Continued)

OTHER PUBLICATIONS

U.S. Appl. No. 11/404,105 entitled Routing, filed Apr. 13, 2006.

(Continued)

*Primary Examiner* — Issac M Woo
(74) *Attorney, Agent, or Firm* — Rory D. Rankin; Meyertons, Hood, Kivlin, Kowert & Goetzel, P.C.

(57) ABSTRACT

A system and method for creating a consistent view of previously backed up data. In one embodiment, a point in time copy of a set of data is requested. The point in time copy includes a base image of the set of data and additional data corresponding to transactions targeted to the set of data which are received during creation of the point in time copy. A subset of the additional data usable to generate a consistent view of the set of data from the base image is determined. A file that includes a set of changes to the base image represented by the subset is created and stored in association with the base image. Responsive to a request for access to the copy, the previously stored subset is utilized to create a consistent virtual view of the copy from the base image.

20 Claims, 7 Drawing Sheets

(56) References Cited

U.S. PATENT DOCUMENTS

| | | |
|---|---|---|
| 7,409,523 B2 | 8/2008 | Pudipeddi |
| 7,424,514 B2 | 9/2008 | Noble et al. |
| 7,454,592 B1 | 11/2008 | Shah |
| 7,478,113 B1 | 1/2009 | De Spiegeleer et al. |
| 2001/0045962 A1 | 11/2001 | Lee |
| 2002/0107877 A1 | 8/2002 | Whiting et al. |
| 2004/0044707 A1 | 3/2004 | Richard |
| 2004/0143731 A1 | 7/2004 | Audebert et al. |
| 2004/0172577 A1* | 9/2004 | Tan et al. ................ 714/13 |
| 2005/0027766 A1 | 2/2005 | Ben |
| 2005/0198328 A1 | 9/2005 | Lee et al. |
| 2005/0204108 A1 | 9/2005 | Ofek |
| 2005/0216813 A1 | 9/2005 | Cutts et al. |
| 2006/0026219 A1 | 2/2006 | Orenstein et al. |
| 2006/0271540 A1 | 11/2006 | Williams |
| 2007/0192548 A1 | 8/2007 | Williams |
| 2007/0198659 A1 | 8/2007 | Lam |
| 2007/0250674 A1 | 10/2007 | Fineberg et al. |
| 2008/0005141 A1 | 1/2008 | Zheng et al. |
| 2008/0133561 A1 | 6/2008 | Dubnicki et al. |
| 2008/0140731 A1* | 6/2008 | Ohno et al. ................ 707/200 |
| 2008/0154989 A1 | 6/2008 | Arman |
| 2008/0195827 A1* | 8/2008 | Saika ................ 711/162 |
| 2008/0228939 A1 | 9/2008 | Samuels et al. |
| 2008/0243769 A1 | 10/2008 | Arbour et al. |
| 2008/0243953 A1 | 10/2008 | Wu et al. |
| 2008/0244204 A1 | 10/2008 | Cremelie et al. |
| 2010/0058010 A1* | 3/2010 | Augenstein et al. ........ 711/162 |
| 2010/0083003 A1 | 4/2010 | Spackman |
| 2010/0250896 A1 | 9/2010 | Matze |
| 2010/0257403 A1 | 10/2010 | Virk et al. |
| 2010/0274982 A1 | 10/2010 | Mehr et al. |
| 2010/0332452 A1 | 12/2010 | Hsu et al. |
| 2011/0093436 A1* | 4/2011 | Zha et al. ................ 707/639 |
| 2011/0167221 A1* | 7/2011 | Pangal et al. ............ 711/117 |
| 2011/0191561 A1* | 8/2011 | Brassow ................ 711/163 |

OTHER PUBLICATIONS

U.S. Appl. No. 11/403,379 entitled Parallel Backup, filed Apr. 13, 2006.

U.S. Appl. No. 11/641,389, filed Dec. 18, 2006 entitled "Single Instance Storage".

\* cited by examiner

GENERATING DATA SET VIEWS FOR BACKUP RESTORATION

BACKGROUND OF THE INVENTION

1. Field of the Invention

This invention is related to performing backup and restore operations and, more particularly, to performing granular restorations of data.

2. Description of the Relevant Art

Backup systems are used to protect data against loss. Typically, a backup system includes software that copies the content of a set of data from a first storage device, or location, to a backup storage device. Frequently, the data is backed up and stored as a backup image, which may be a single file representing the content and structures of the backed up data. Examples of sets of data include data structures such as files, directories, databases, and volumes. If data is lost in the original set of data, the backed-up content of the set of data can be retrieved from the backup storage device and restored. Once the backed-up content is restored, it is available for use.

Conventional backup systems have traditionally created full-data structure images for full sets of data. These full-data structure images have enabled users to restore an entire data structure, such as a database, to its status at a particular time. Recently, backup systems have developed that allow selective restoration, commonly called granular restoration, of parts of a set of data, such as individual entries in a database, to the state of those entries at a particular time.

Unfortunately, existing systems for granular restoration of a set of data require the use of cumbersome processes that require the evaluation of overbroad change histories to reconstruct the status of the data structure at a particular time. These cumbersome and inefficient processes must be executed prior to allowing a user select items for restoration. The value of granular restoration technology is diminished by the delays inherent in current conventional methods for reconstructing the status of a set of data.

SUMMARY OF EMBODIMENTS OF THE INVENTION

In one embodiment, a point in time copy of a set of data is requested. The point in time copy includes a base image of the set of data and additional data corresponding to transactions targeted to the set of data which are received during creation of the point in time copy. A subset of the additional data usable to generate a consistent view of the set of data from the base image is determined. A file that includes a set of changes to the base image represented by the subset is created and stored in association with the base image. Subsequently, a request for access to the point in time copy may be received. In response to the request, the corresponding base image and previously stored file with additional data are accessed. A consistent view of the point in time copy is then generated by applying changes represented by the additional data to the base image. Access to the consistent view is then provide to simulate access to the point in time copy.

These and other embodiments are contemplated and will be appreciated upon reference to the following description and drawings.

BRIEF DESCRIPTION OF THE DRAWINGS

The following detailed description makes reference to the accompanying drawings, which are now briefly described.

Figure 1:
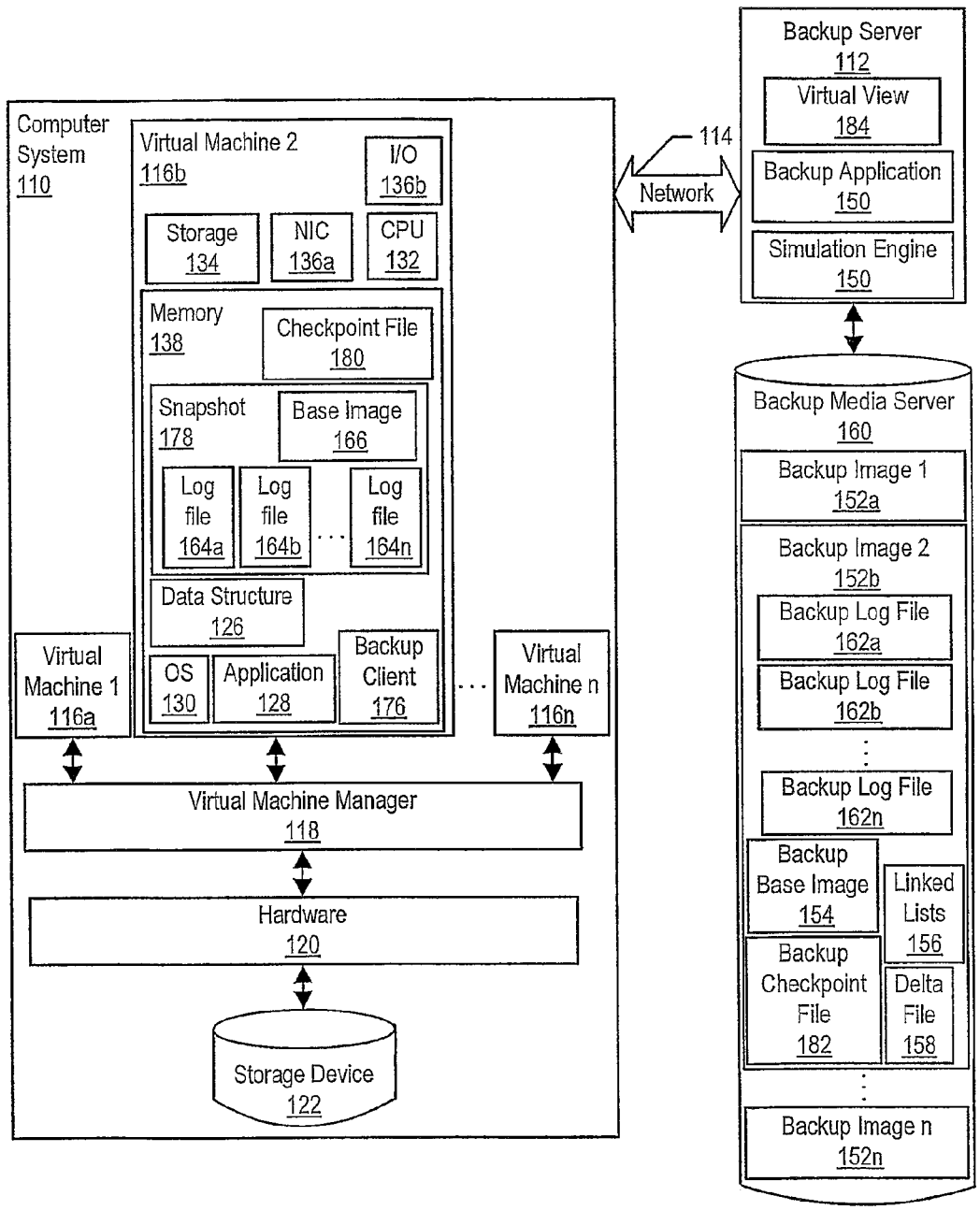
FIG. 1 is a block diagram of a computer system and a backup server that is used in granular restoration operations to restore portions of a set of data associated with the computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Embodiments described below allow for the backup and granular restoration of data from a set of data, such as a data structure. In one embodiment, backup and restoration operations employ a snapshot of the data structure. The snapshot is a point in time copy of the data structure. A backup operation is performed using the snapshot of the data structure (or an alternative point in time copy of an alternative set of data), rather than the data structure itself, in order to limit the length of time that the backup operation slows or halts other operations that are queued to be performed with respect to the data structure or otherwise targeted to the set of data during the period of the backup operation. The snapshot includes a base image of the data structure and additional data, such as a set of log files. In embodiments in which the additional data is stored as log files, the log files represent, through a series of log file entries, transactions queued to be performed on the data structure during creation of the snapshot.

A subset of the additional data, such as a group of log files, is usable to generate from the base image a consistent view of the data structure at a given point in time. Use of a subset, rather than the complete set of log files, reduces the required processing time and resources involved in generating the consistent view. The subset is determined, as discussed below. A file is created that comprises a set of changes to the base image represented by the subset of the log files or other additional data. In one embodiment, the file is a delta file that is created by trapping a set of changes associated with the subset. Trapping a set of changes means, rather than performing to the base image a write operation indicated by a change associated with a log file from the subset, the write operation is recorded to the delta file. The file is stored in association with the base image.

In one embodiment, responsive to a request to access a backup of the data structure, the consistent view of the data structure is generated by applying from the delta file to a backup of the base image a set of changes representing the subset of log files. Applying the delta file to the base image in response to the request for access, rather than responding to a request for access by processing the entire set of log files from which the subset was selected, achieves an increase in the efficiency of granular restore operations. Access to the backup of the data structure is simulated by providing access to the consistent view of the data structure.

With reference now to the figures, and in particular with reference to FIG. 1, a block diagram of a computer system and a backup server that is used in granular restoration operations to restore portions of a set of data associated with the computer system is depicted. A computer system 110 and a backup server 112 are coupled via a network 114. In the illustrated embodiment, computer system 110 and backup server 112 are separate computer systems. In other embodiments, it is contemplated that backup server 112 may also be executed in a virtual machine on computer system 110. That is, the backup server's virtual machine would be separate from the virtual machines that encapsulate the applications for which backup server 112 performs backup operations. Additionally, in other embodiments, it is contemplated that backup server 112 may also be executed directly on the hardware of computer system 110 with no intervening virtual machine.

Computer system 110 includes one or more virtual machines (e.g. virtual machines 116a-116n as illustrated in FIG. 1). Virtual machines 116a-116n are controlled by a virtual machine monitor (VMM) 118. Virtual machines 116A-116B and VMM 118 may comprise software and/or data structures. The software may be executed on the underlying hardware in computer system 110 (e.g., hardware 120). Hardware 120 may include any desired circuitry. For example, hardware 120 may include one or more processors, or central processing units (CPUs), storage, and input/output (I/O) circuitry, as discussed in greater detail below with respect to FIG. 6. In the embodiment of FIG. 1, computer system 110 includes a storage device 122. Storage device 122 is generally part of hardware 120, but is shown separately in FIG. 1.

As shown in FIG. 1, each application executing on computer system 110 executes within one of virtual machines 116a-116n. Generally, a virtual machine comprises any combination of software, one or more data structures in memory, and/or one or more files stored on a storage device (such as the storage device 122). Under control of VMM 118, virtual machines 116a-116n mimic operations of hardware used during execution of applications that are encapsulated by virtual machines 116a-116n. For example, in virtual machine 116b, an application 128 is shown. Application 128 is designed to execute on virtual machine 116b through an operating system (O/S) 130. In the embodiment portrayed in FIG. 1, application 128 operates on a set of data embodied as a data structure 126, such as, for example, a database. A backup client 176 also executes on virtual machine 116b through operating system 130. Application 128, backup client 176 and O/S 130 are coded with instructions executed by a virtual CPU 132.

Additionally, application 128, backup client 176 and/or O/S 130 may make use of virtual memory 138, one or more virtual storage devices 134, and virtual input/output (I/O) such as network interface card (NIC) 136a and input output (I/O) device 136b. Virtual storage devices 134 may mimic any type of storage, such as disk storage, tape storage, etc. The disk storage may be any type of disk (e.g. fixed disk, removable disk, compact disc read-only memory (CD-ROM), rewriteable or read/write CD, digital versatile disk (DVD) ROM, etc.).

Each instance of virtual disk storage in the virtual machine may be mapped to a file on a storage device such as storage device 122. Alternatively, each instance of virtual disk storage may be mapped directly to a physical storage device, or a combination of direct mappings and file mappings may be used. The virtual I/O devices may mimic any type of I/O devices, including modems, audio devices, video devices, network interface controller (NICs), universal serial bus (USB) ports, firewire (IEEE 1394) ports, serial ports, parallel ports, etc. Generally, each virtual I/O device may be mapped to a corresponding I/O device in the underlying hardware or may be emulated in software (e.g., VMM 118) if no corresponding I/O device is included in the underlying hardware.

Specifically, in the embodiment of FIG. 1, virtual NIC 136a allows application 128, backup client 176, and/or O/S 130 to communicate with other virtual machines and/or other computer systems. For example, when a backup application 150 on backup server 112 is to communicate with backup client 176 on virtual machine 116b, backup application 150 may generate a communication to backup client 176. The communication may be formatted into one or more packets for transmission on network 114 to computer system 110. An identifier in a packet (e.g. the Internet Protocol (IP) address or the MAC address) may be assigned to virtual NIC 136a and may identify virtual machine 116b as the destination of the packet.

The virtual machine in which an application is executing encapsulates the application (and its O/S) and encompasses the entire system state associated with the application. Generally, when a virtual machine is active (i.e. an application within the virtual machine is executing on hardware 120), the virtual machine may be stored in the memory of the computer system on which the virtual machine is executing (although the VMM may support a paging system in which various pages of the memory storing the virtual machine may be paged out to local storage in the computer system) and in the files which are mapped to the virtual storage devices in the virtual machine.

The virtual hardware of virtual machine 116b (and other virtual machines among virtual machines 116a-116n) may simulate hardware similar to the hardware 120 included in the computer system 110. For example, virtual CPU 132 may implement the same instruction set architecture as the processor(s) in hardware 120. In such cases, virtual CPU 132 may be one or more data structures storing the processor state for the virtual machine 116b. Software instructions of application 128, backup client 176 and O/S 130 may execute on the CPU(s) in the hardware 120 when virtual machine 116b is scheduled for execution by VMM 118. When VMM 118 schedules virtual machine 116b for execution, VMM 118 may load a state of virtual CPU 132 into a CPU of hardware 120. Similarly, when VMM 118 stops virtual machine 116b to schedule another virtual machine for execution (e.g., virtual machine 116a), VMM 118 may write the state of the processor into a data structure representing virtual CPU 132. Alternatively, virtual CPU 132 may be different from the CPU(s) in hardware 120. For example, virtual CPU 132 may comprise software coded using instructions from the instruction set supported by the underlying CPU to emulate instruction execution according to the instruction set architecture of virtual CPU 132. Alternatively, VMM 118 may emulate the operation of the hardware in the virtual machine. Similarly, any virtual hardware in a virtual machine may be emulated in software if there is no matching hardware in hardware 120.

Different virtual machines that execute on the same computer system 110 may differ in many particulars of their configuration and operation. For example, O/S 130 may differ from the OS included in any other one of virtual machines 116a-116n. Different virtual machines may employ different versions of the same O/S (e.g., Microsoft Windows NT with different service packs installed), different versions of the same O/S family (e.g., Microsoft Windows NT and Microsoft Windows2000), or different O/Ss (e.g., Microsoft Windows NT, Linux, Sun Solaris, etc.).

Generally, VMM 118 may be responsible for managing virtual machines 116a-116n on computer system 110. VMM 118 may schedule virtual machines for execution on the underlying hardware 120, using any scheduling scheme. For example, a time division multiplexed scheme may be used to assign time slots to each of virtual machines 116a-116n. In one embodiment, VMM 118 may be the ESX product available from VMware, Inc. (Palo Alto, Calif.). Other embodiments may include the Xen virtual machine monitor available as freeware, virtual machine monitors available from Microsoft, Inc., etc.

In the illustrated embodiment, VMM 118 may execute directly on the underlying hardware (i.e., without an underlying operating system). In other embodiments, VMM 118 may be designed to execute within an operating system. For example, the GSX product available from VMware, Inc. may execute under various versions of Microsoft's Windows operating system and/or the Linux operating system.

Storage device 122 may be any type of storage device to which computer system 110 may be coupled. For example, storage device 122 may comprise one or more fixed disk drives such as integrated drive electronics (IDE) drives, small computer system interface (SCSI) drives, etc. The fixed disk drives may be incorporated as peripherals of the computer system 110 through a peripheral bus in computer system 110 such as the peripheral component interconnect (PCI) bus, USB, firewire, etc. Alternatively, storage device 122 may couple to a network (e.g., network attached storage (NAS) or storage area network (SAN) technologies may be used). Storage device 122 may be included in file servers to which the computer system 110 has access. Storage device 122 may also be removable disk drives, memory, etc. Generally, a storage device is any device which is capable of storing data.

It is noted that, while virtual machine 116b includes only one application, a virtual machine generally may include one or more applications. For example, in one embodiment a user may execute all applications which execute on the same underlying O/S 130 in the same virtual machine.

It is noted that the term "program," as used herein, refers to a set of instructions which, when executed, perform the function described for that program. The instructions may be machine level instructions executed by a CPU, or may be higher level instructions defined in a given higher level language (e.g., shell scripts, interpretive languages, etc.). The term "software" may be synonymous with "program."

The operating system of the virtual machine, such as O/S 130 on virtual machine 116b, may support a command to suspend operations of application 128 on data structure 126. For instance, such a command to suspend operations of application 128 on data structure 126 may be used during creation of a snapshot 178 of data structure 126. In some embodiments, such a command to suspend operations of application 128 on data structure 126 will entirely halt operations of application 128 on data structure 126. In other embodiments, such a command to suspend operations of application 128 on data structure 126 will merely slow operations of application 128 on data structure 126. During the time that a suspend command is active, operations of application 128 on data structure 126 are queued for subsequent commitment to data structure 126. For instance, in one embodiment, during the creation of a snapshot 178 of data structure 126, suspension of operations of application 128 on data structure 126 results in creation within snapshot 126 of a base image 166 (representing the state of data structure 126 at the time of the initiation of creation of snapshot 126) and a series of log files 164a-164n (representing operations of application 128 on data structure 126 that were queued during the period of suspension of operations of application 128 on data structure 126 to allow for creation of snapshot 126).

Operations of application 128 on data structure 126 may be resumed using a resume command supported by operating system 130. In one embodiment, receiving a signal that snapshot 178 has been completed, application 126 executes operations on data structure 126 that were queued during creation of snapshot 178.

In one embodiment, backup application 150 is configured to perform a backup operation for one or more data structures residing on virtual machines 116a-116n, such as data structure 126 on virtual machine 116b. Backup application 150 may use snapshot capabilities of a virtual machine, such as virtual machine 116b, to obtain the data to be backed up, creating snapshot 178 of data structure 126. In one embodiment, snapshot 178 contains base image 166, reflecting the state of data structure 126 and metadata associated with the data structure at the time of snapshot initiation, as well as additional data in log files 164a-164n, with each of log files 164a-164n reflecting one or more transactions queued to be written to data structure 126 during the time that snapshot 178 was being created, as described above. A checkpoint file 180 contains notations or other content indicating whether a transaction represented by one or more of log files 164a-164n has been written to base image 166.

Backup application 150 may obtain metadata from application 128 (or other applications) executing within virtual machine 116b, from which data structure 126 is being backed-up. In general, the metadata may describe the logical structure of the application data in data structure 126 that is being backed up. Accordingly, with the metadata, backup application 150 may discover the organization of the "raw" data in data structure 126 and thus may provide for granular restoration of data items from data structure 126 by providing the ability to browse, access and restore individual data items or logical objects that were originally present within data structure 126 at the time of creation of a backup image. By describing the logical structure of the data within data structure 126, the metadata may identify logical objects in the backed-up data stored in a backup image. The logical objects in the backed-up data stored in a backup image may be individually identified for retrieval and restoration. In some embodiments, the identified objects may be application dependent. For example, if the application is an email server such as Microsoft's Exchange Server, the objects may be individual messages and/or message folders and/or address books. If the application is a database, the objects may be database records and/or database tables. If the application is a file system or directory service, the objects may be files and/or directories.

Backup application 150 may thus support granular restoration (i.e., restoration of objects that are less than the full image of the data structure). In an alternative embodiment, the granular restoration may be supported without requiring that backup software be installed in the virtual machine from which the selected data structure is being backed up. Rather than residing on one of virtual machines 116a-116n, a backup client (not shown) may be located on computer system 110, for instance, as a component of virtual machine manager 118. Accordingly, user's desires not to install such software on virtual machines 116a-116n may be respected, in some embodiments, while still providing a granular restoration capability. In some embodiments, the cost of obtaining licensed copies of a backup application for each virtual machine may be avoided. Additionally, a system administrator or other individual with responsibility for ensuring data integrity may schedule backup policies for each of virtual machines 116a-116n through VMM 118, without relying on a user of one of virtual machines 116a-116n to establish the policies and without concern about the possibility of tampering with the policies by a user of the virtual machine.

In one embodiment, backup application 150 may obtain a login account on the virtual machine containing the data structure to be backed up, in order to obtain metadata from applications executing on the virtual machine. The login account permits remote access to the virtual machine. That is, the login account permits the remote application (e.g., backup application 150) to transmit requests to backup client 176 in virtual machine 116b, for example. The requests are formed into packets that target virtual NIC 136a, for example, and thus would be communicated to backup client 176 within virtual machine 116b. Accordingly, in general, a request originating outside virtual machine 116a may be used to obtain metadata. The request may originate in backup application 150, which may be executing on a different computer system, such as backup server 112, than computer system 110, which executes virtual machines 116a-116n. In other embodiments, the request for metadata may originate in a different virtual machine on computer system 110 (e.g., a virtual machine encapsulating backup application 150). Accordingly, in such embodiments, requests from backup application 150 to an application in a virtual machine may be characterized as remote requests with respect to the virtual machine and/or the application in the virtual machine. Alternatively, requests for metadata may originate in a backup client on a virtual machine, such as backup client 176 on virtual machine 116b requesting metadata for data structure 126 from application 128.

Backup application 150 may store backup images on a backup media server 160 coupled to backup server 112. In one embodiment, backup media server 160 stores several backup images 152a-152n. Backup image 152b contains a backup base image 154, backup log files 162a-162n, backup checkpoint file 182, a set of linked lists 156 and a delta file 158. Backup image 152b is a backup copy of snapshot 178. Backup base image 154 is a backup copy of base image 166. Backup log files 162a-162n are backup copies of log files 164a-164n and each reflects one or more transactions queued to be written to data structure 126 during the time that snapshot 178 was being created or otherwise corresponds to transactions targeted to the set of data which are received during creation of the point in time copy. Backup checkpoint file 182 contains notations or other content indicating whether a transaction represented by each of log files 164a-164n has been written to base image 166. Linked lists 156 contain a listing of log files 164a-164n determined, based on indications in backup checkpoint file 182, as being needed to construct a consistent view of data structure 126 from backup base image 154. Delta file 158 contains a listing of actual write operations needed to construct a consistent view of data structure 126 from backup base image 154.

A "consistent view" of a set of data corresponding to a given snapshot is a representation of the data in the snapshot as modified by any transactions targeted to the data during a period of time in which the snapshot is created. In one embodiment, this period of time generally corresponds to a time between initiation of the creation of the snapshot and its completion. For example, in one embodiment, a consistent view of a data structure is a representation of the data structure at a particular point in time, including all write transactions that have been queued between the point in time of the start of a snapshot and the point in time at which the snapshot finishes. In one embodiment, a consistent view may be created by applying a set of changes represented by these transactions to a backup of the base image. In one embodiment, these changes may be represented by at least a subset of the logfiles (e.g., as represented by the above described delta file). Accordingly, the base image itself that was stored as part of the snapshot does not include all data necessary to provide the consistent view. In one embodiment, a virtual view 184 created by a simulation engine 150 provides such a consistent view of data structure 126 using the content of backup image 152b. Access to the content of backup image 152b is simulated by backup application 150 by providing access to virtual view 184. Thus, in one embodiment, access to content, such as delivery of an entry from a database, is provided by simulating access to virtual view 184.

In one embodiment, backup application 150 may perform storage mapping on backup images 152a-152n by using metadata to identify the objects in backup images 152a-152n. Generally, storage mapping may refer to determining the logical organization of data, down to the storage locations on a storage device (e.g., disk blocks on a disk). That is, the process of storage mapping may include interpreting the metadata obtained from an application to locate the data that corresponds to a given object on the storage device. In this fashion, the identified objects may be retrieved from the image and support for granular restoration may be provided. In one embodiment, a catalog (not shown) of objects and corresponding storage locations may be generated by backup application 150 and stored as part of a corresponding backup image.

Generally, backup media server 160 may provide storage on any storage medium capable of storing data. For example, backup media server 160 may contain a storage device similar to storage device 122. The storage medium of backup media server 160 may be a removable storage device, to allow the storage medium of backup media server 160 to be physically separated from backup server 112 after the backup is complete. Storing the storage medium of backup media server 160 in a location physically separated from backup server 112 may increase the reliability of the backup, because an event that causes problems on backup server 112 may not affect the storage medium of backup media server 160. For example, the storage medium of backup media server 160 may comprise a removable disk or disk drive, a tape backup, writeable compact disk storage, etc. Alternatively, the storage medium of backup media server 160 may comprise another computer system coupled to receive the backup data from the backup server 112 (e.g., via a network coupling the two computer systems), a storage device attached to a network to which the backup server is attached (e.g., NAS or SAN technologies), etc.

In the embodiment portrayed in FIG. 1, backup client 176 and backup application 150 enable the performance of backup and granular restoration operations with respect to data structure 126 by creating snapshot 178 containing base image 166 and log files 164a-164n and creating checkpoint file 180. Backup client 176 and backup application 150 transfer snapshot 178 and checkpoint file 180 to backup server 112 over network 114. At backup server 112, backup image 152b is created by storing copies of base image 166, log files 164a-164n and checkpoint file 180 as backup base image 154, backup log files 162a-162n and backup checkpoint file 182, respectively. Additionally, backup application 150 determines which of backup log files 162a-162n are necessary to create a consistent view of backup base image 154 and stores as linked lists 156 one or more lists indicating which of backup log files 162a-162n are necessary to create a consistent view of data structure 126 from backup base image 154. In one embodiment, backup application 150 determines which of backup log files 162a-162n are necessary to create a consistent view of data structure 126 from backup base image 154 by examining backup checkpoint file 182 to ascertain which of the transactions represented by backup log files 162a-162n have already been committed to backup base image 154. Such transactions represented by backup log files 162a-162n were committed to backup base image 154 by writing the changes indicated by backup log files 162a-162n to backup base image 154.

Backup application 150 creates a virtual view 184 of data structure 126 by executing through the transactions represented by the ones of backup log files 162a-162n listed in linked lists 156 as being needed to create the consistent view and generating the write transactions necessary to update virtual view 184 from the state represented in backup base image 154 to a consistent state. Rather than actually performing to backup base image 154 the write transactions necessary to update backup base image 154 to a consistent state, the write transactions necessary to update backup base image 154 to a consistent state are trapped (diverted) and written to delta file 158. Backup application 150 stores delta file 158 as part of backup image 152b. In some embodiments, access to delta file 158 is provided to application 128 in order to allow application 128 to confirm that a backup image is a consistent view. Virtual view 184 is then discarded. In some embodiments, a point in time represented by the consistent view can be shifted by applying from a second delta file (not shown) to backup base image 154 a second set of changes representing a second subset of log files.

In response to a request to browse and perform a granular restoration of a data item to data structure 126, backup client 176 and backup application 150 regenerate and provide access to virtual view 184, thereby presenting a consistent view of data structure 126 from backup base image 154 after the performance of the transactions represented by the ones of backup log files 162a-162n listed in linked lists 156. This virtual view 184 is created by merging or otherwise applying to backup base image 154 delta file 158 according to linked lists 156. Creation of virtual view 184 by merging backup base image 154 and delta file 158 according to linked lists 156 allows for the use of a subset of those backup log files 162a-162n necessary to create a consistent view of backup base image 154, rather than the use of all of backup log files 162a-162n. Use of a subset of backup log files 162a-162n reduces the number of backup log files 162a-162n that must be processed in order to create a consistent view of data structure 126 from backup base image 154 and, in one embodiment, reduces the time and resource allocation necessary to support a granular restoration of data from backup image 152b.

Figure 2A:
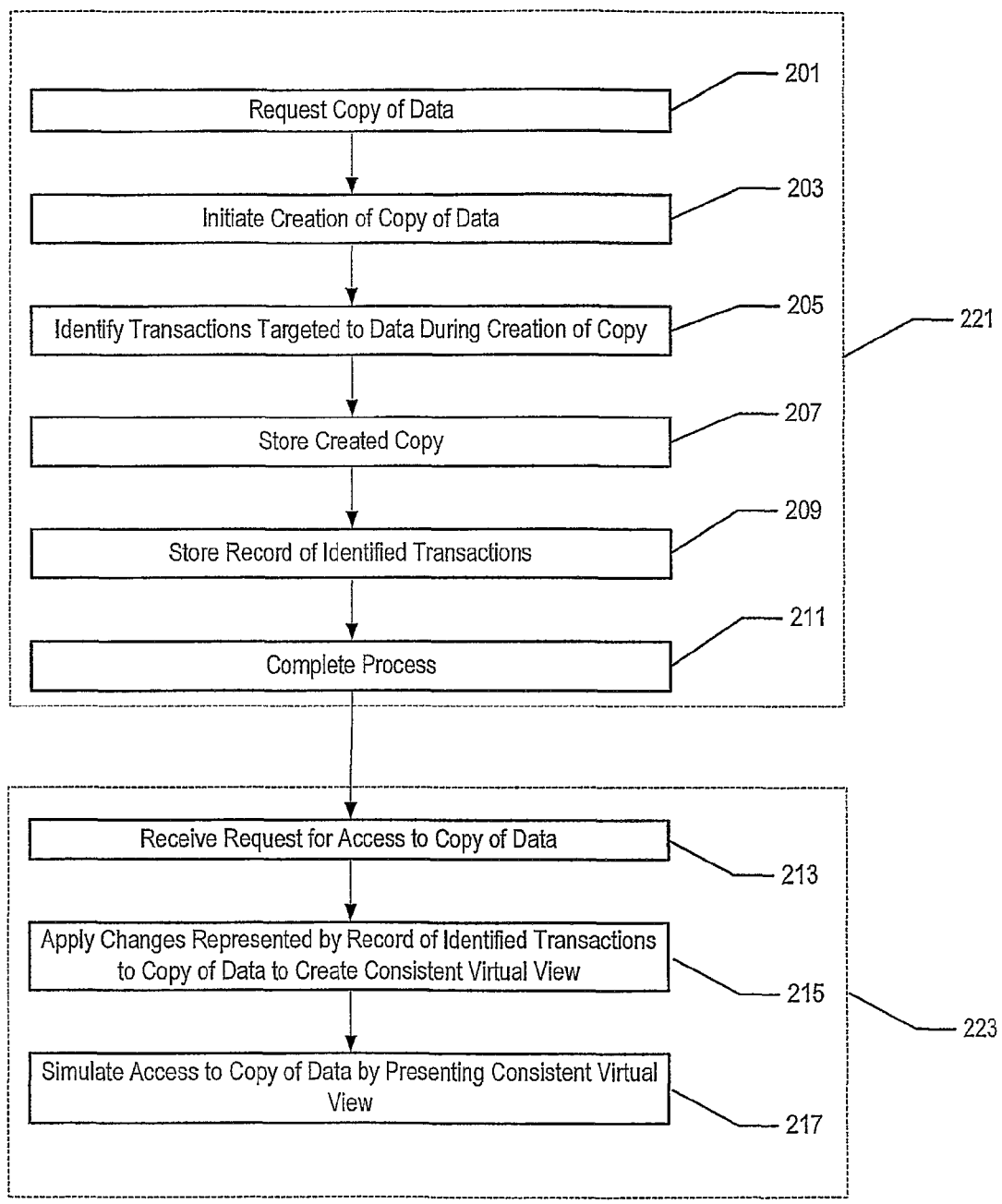
FIG. 2A is a flowchart illustrating operations performed by one embodiment of a backup and granular restore process.

FIG. 2A illustrates one embodiment of a method for copying data and creating a consistent virtual view that may be used for granular restore operations. As shown, FIG. 2A depicts two blocks of operations. The first block (221) generally corresponds to operations performed in the creation of a copy of data. The second block (223) generally corresponds to operations performed in response to a request for access to the previously created copy of data. As may be appreciated, the operations/events of block 221 may occur prior to those of block 223 by a relatively small or large amount of time.

In the example of FIG. 2A, a request to create a point in time copy of a set of data is received (201). In one embodiment, while not necessarily so, the request may be received as part of a backup operation. Subsequent to receiving the request, creation of the point in time copy may be initiated (203). During creation of the point in time copy, further transactions may be received which are targeted to the data being copied. Some of these transactions may be such that they would modify the data (e.g., write transactions) were they applied to the data currently being copied. Additionally, many other transactions targeted to the data being copied may also be received during creation of the copy. In one embodiment, during creation of the copy these additional transactions which are received are not applied to the copy being created. Rather, those transactions of the many received during creation of the copy which would modify the particular data being copied are identified (205). When creation of the copy is completed and/or during its creation, the copy is stored (207) and a record of the identified transactions is also stored (209). The stored copy of data may be referred to as the "base" image. In one embodiment, the record is stored as a separate file and is identified as being associated with the stored copy of data. Such association may be implicit (e.g., the record is stored with the copy in a particular location), or explicit (e.g., via metadata), or both. The copy process may then complete (211).

At some point in time subsequent to creation of the copy, a request for access to the copy of data may be received (213). In response to the request, the copy of data (the base image) is accessed, and the previously stored record of further transactions is accessed. Changes represented by the record are then applied to the base image to create a consistent virtual view of the data (215). In one embodiment, these changes may not actually be applied to the base image. Rather, the data may be presented in a view that shows the data as it would be modified by the changes. Further, one or more transformative steps may be required when applying changes represented by the record. The consistent virtual view is then made available for presentation in order to simulate access to the data.

Figure 2B:
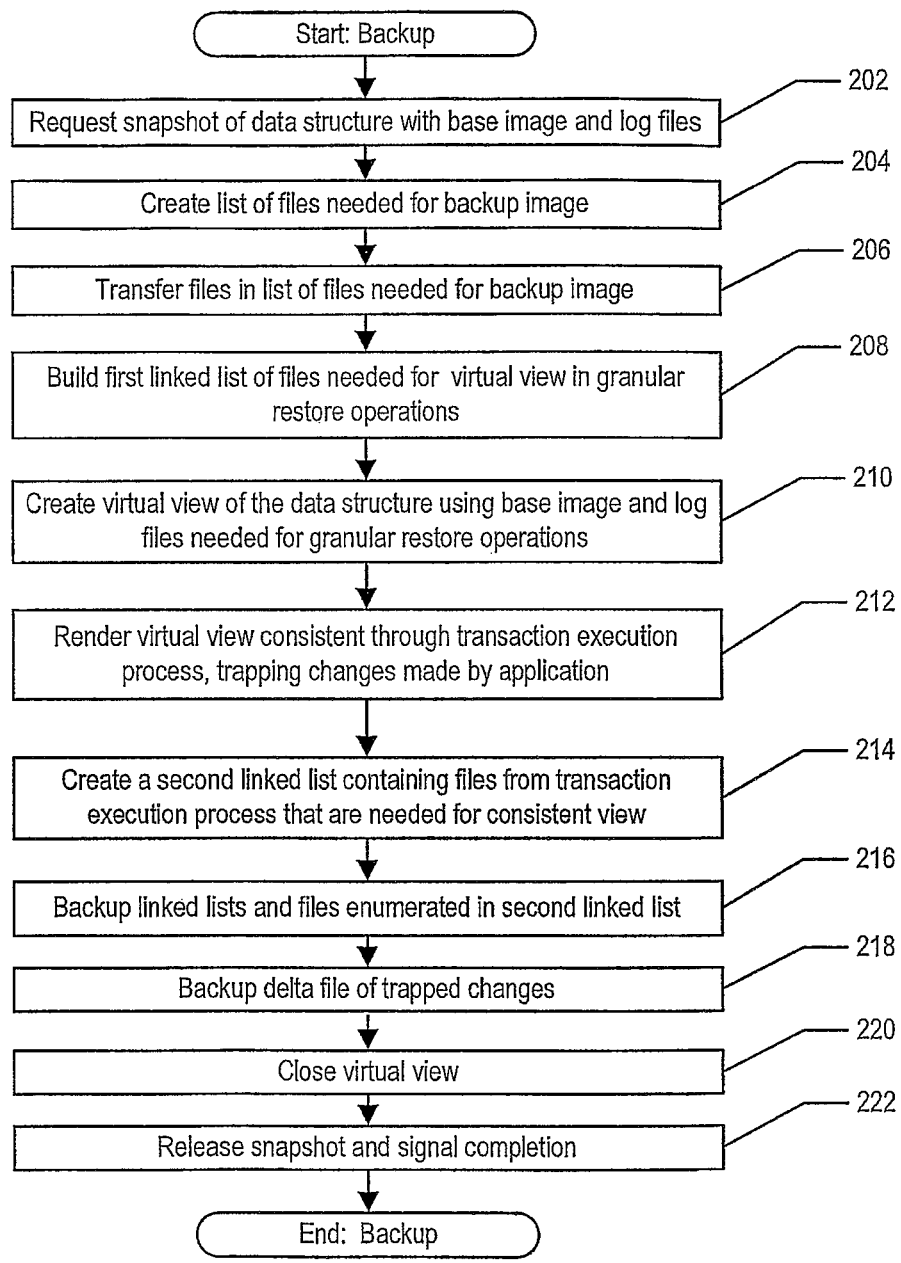
FIG. 2B is a flowchart illustrating operations performed by one embodiment of a backup application used to generate a backup copy suitable for granular restoration of portions of a set of data.

Turning now to FIG. 2B, a flowchart illustrating operations performed by one embodiment of a backup application used to generate a backup copy suitable for granular restoration of portions of a set of data is depicted. A snapshot of a data structure is requested (202). In one embodiment, the snapshot is a point in time copy of a set of data and contains a base image depicting the status of the set of data at the beginning of the snapshot process and a set of log files embodying additional data by listing transactions that represent changes to the set of data that have been queued for execution during the period of snapshot creation or are otherwise targeted to the set of data and are received during creation of the point in time copy.

A list of files needed for a backup image is created (204). In one embodiment, the list of files needed for the backup image will include a base image, log files, and a checkpoint file. The files in the list of files needed for the backup image are then transferred from a computer system on which the data structure that is the subject of the backup operation resides to a computer system on which the backup application resides (206). A first linked list (or any other suitable data structure), containing a list of a subset of log files needed for a consistent virtual view in granular restore operations, is created (208). This first linked list contains a list of log files that are marked in a checkpoint file as representing transactions to the data structure that have been queued during the period of snapshot creation for execution against the data structure selected for backup (but as having not been executed to the base image).

A virtual view is then created using the base image and log files from the snapshot discussed above (210). The virtual view is then rendered consistent by executing transactions indicated in log files listed in the linked list (212). Transactions are executed by the backup application by sending calls embodying the transactions of a log file to a simulation engine capable of emulating or communicating with an Application Program Interface of an application associated with the data structure and receiving in return a write transaction intended for the backup base image. Rather than actually making changes by allowing write operations to be executed and thereby alter the base image, the write operations associated with each transaction are trapped. Trapping the write operations involves diverting ordered write operations associated with the transactions to a delta file by blocking the write operation, recording the write operation to the delta file, and recording to the delta file the location within the data structure to which the write operation was directed.

A second linked list is created listing any files that were created in the transaction execution process and are needed to build a consistent virtual view (214)—such as temporary or overhead files. The linked lists and all files enumerated in the second linked list are added to the backup image (216). The delta file is added to the backup image (218), thereby, in one embodiment, storing in conjunction with the base image a file that comprises a set of changes to the subset. The virtual view is then closed, which, in some embodiments, means that data structures representing the virtual view are released or deleted (220). The snapshot is then released, completion of the backup is signaled to the backup client (222), and the process ends.

In one embodiment, a backup image capable of supporting granular restoration operations will result from the operations discussed above with respect to FIG. 2B. A backup application may perform a series of steps to simulate access to such a backup image capable of supporting granular restoration by generating a consistent virtual view of the data structure from the backup and providing access to the virtual view. The virtual view may be created by merging or otherwise applying to a backup base image a delta file according to linked lists. The operations described below with respect to FIG. 3 allow for the use of a subset including those backup log files necessary to create a consistent view of a backup base image, rather than the use of all backup log files associated with a given backup image. Use of a subset of backup log files reduces the number of backup log files that must be processed in order to create a consistent view of a data structure and, in one embodiment, reduces the time and resource allocation necessary to support a granular restoration of data from backup image.

Figure 3:
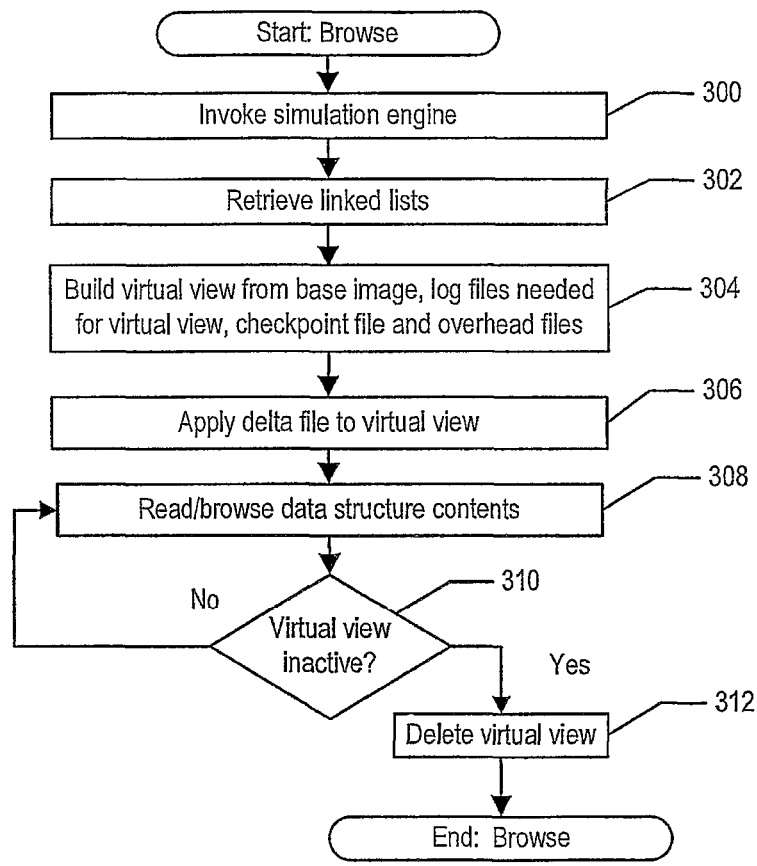
FIG. 3 is a flowchart illustrating operations performed by one embodiment of a backup application during a session for selection of a portion of a set of data for restoration.

Referring now to FIG. 3, a flowchart of operations performed by one embodiment of a backup application during a session for selection of a portion of a set of data for restoration is illustrated. In response to a request to access a backup image of particular data, a simulation engine may be invoked (302). A virtual view is built from components of a backup image of the data, including a base image, log files needed for the virtual view as listed in the associated linked lists, a checkpoint file and any associated overhead files (304). A delta file is then applied to the virtual view to render a consistent (virtual) view (306). The delta file may be applied by examining the linked list and applying writes associated with the log files indicated in the linked lists. Simulated access to the backup of the data (structure) is provided as the backup application is allowed to access the virtual view (308). A determination is made as to whether the virtual view is active (310). If the virtual view is determined to be inactive, such as after a sufficient period during which no requests to access the virtual view have been received from a backup client, the virtual view is deleted (312) and the process ends.

In one embodiment, the operations described above enable a backup application to select an item or other portion of a backup image for restoration to a data structure by providing simulated access to the backup of the data structure. A restoration process provides a granular restoration of the item or other portion of the backup image for restoration to the data structure.

Figure 4:
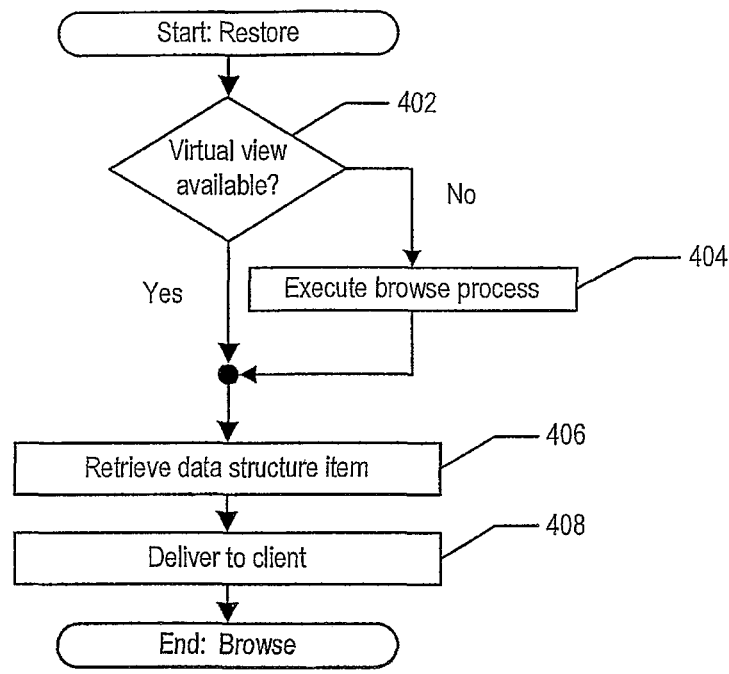
FIG. 4 is a flowchart illustrating operations performed by one embodiment of a backup application during a granular restoration of a portion of a set of data from a backup of the set of data.

Turning now to FIG. 4, a flowchart illustrating operation of one embodiment of a backup application during a granular restoration of a portion of a set of data from a backup of the data is depicted. The operations of FIG. 4 may be performed in response to a request to restore a data item to a data structure from a backup image of a data structure. A determination is made as to whether an active virtual view is currently available (402). If no active virtual view is currently available, a browse process, such as the browse process described above with respect to FIG. 3, is executed to make a currently active virtual view available (404). The requested data item is then retrieved (406) and delivered to the requesting client (408).

In one embodiment, the operations described with respect to FIGS. 2A, 2B, and 3 allow for the use of a subset including those backup log files necessary to create a consistent view of a data structure from a backup base image, rather than the use of all backup log files associated with a given backup image. In order to allow for the use of such a subset, operations discussed below with respect to FIG. 5 are, in one embodiment, employed to determine those backup log files necessary to create a consistent view of a data structure from a backup base image, rather than the use of all backup log files associated with a given backup image.

Figure 5:
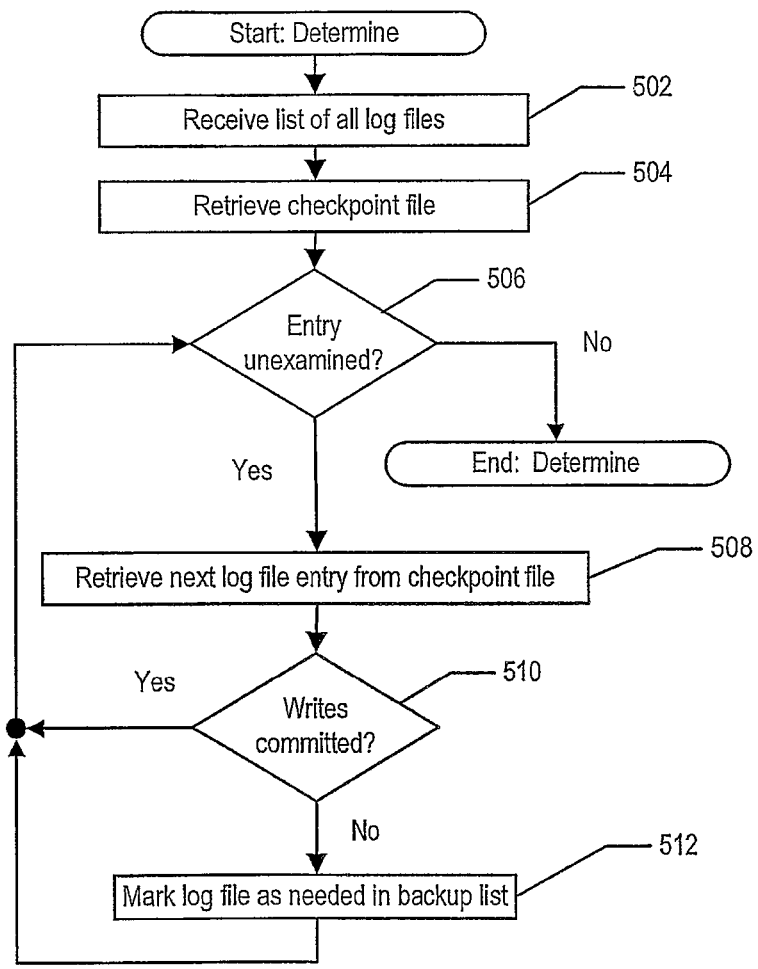
FIG. 5 is a flowchart illustrating operations performed by one embodiment of a backup application while determining a subset of log files usable for to generate a consistent virtual view of a set of data for selection of a portion of the set of data for restoration.

Referring now to FIG. 5, a flowchart illustrating operations performed by one embodiment of a backup application while determining a subset of log files usable to generate a consistent virtual view of a set of data for selection of a portion of the set of data for restoration is illustrated. A list of all log files created during the creation of a snapshot is received (502), and a checkpoint file is received (504). A determination is made as to whether any unexamined entries in the checkpoint file remain (506). If no unexamined entries remain, the process ends.

If an unexamined entry remains, the next unexamined entry is retrieved from the checkpoint file (508). A determination is made, from the entry in the checkpoint file, as to whether a write associated with the transaction represented by the log file indicated in the entry in the checkpoint file has been committed to the data structure associated with the checkpoint file (510). If the write has not been committed, the log file indicated in the entry in the checkpoint file is added to the linked list.

In one embodiment, the operations described above with respect to FIG. 1-FIG. 5 allow a backup application to create backups and provide granular restoration operations by simulating access to a backup image capable of supporting granular restoration through the use of a virtual view. As discussed above, the virtual view is created by merging or otherwise applying to a backup base image a delta file according to linked lists. In one embodiment, the use of a subset including those backup log files necessary to create a consistent view of backup base image in granular restore operations, rather than the use of all of backup log files associated with a given backup image, creates improvements in efficiency. Use of a subset of backup log files reduces the number of backup log files that must be processed in order to create a consistent view of a backup base image and, in one embodiment, reduces the time and resource allocation necessary to support a granular restoration of data from backup image.

Figure 6:
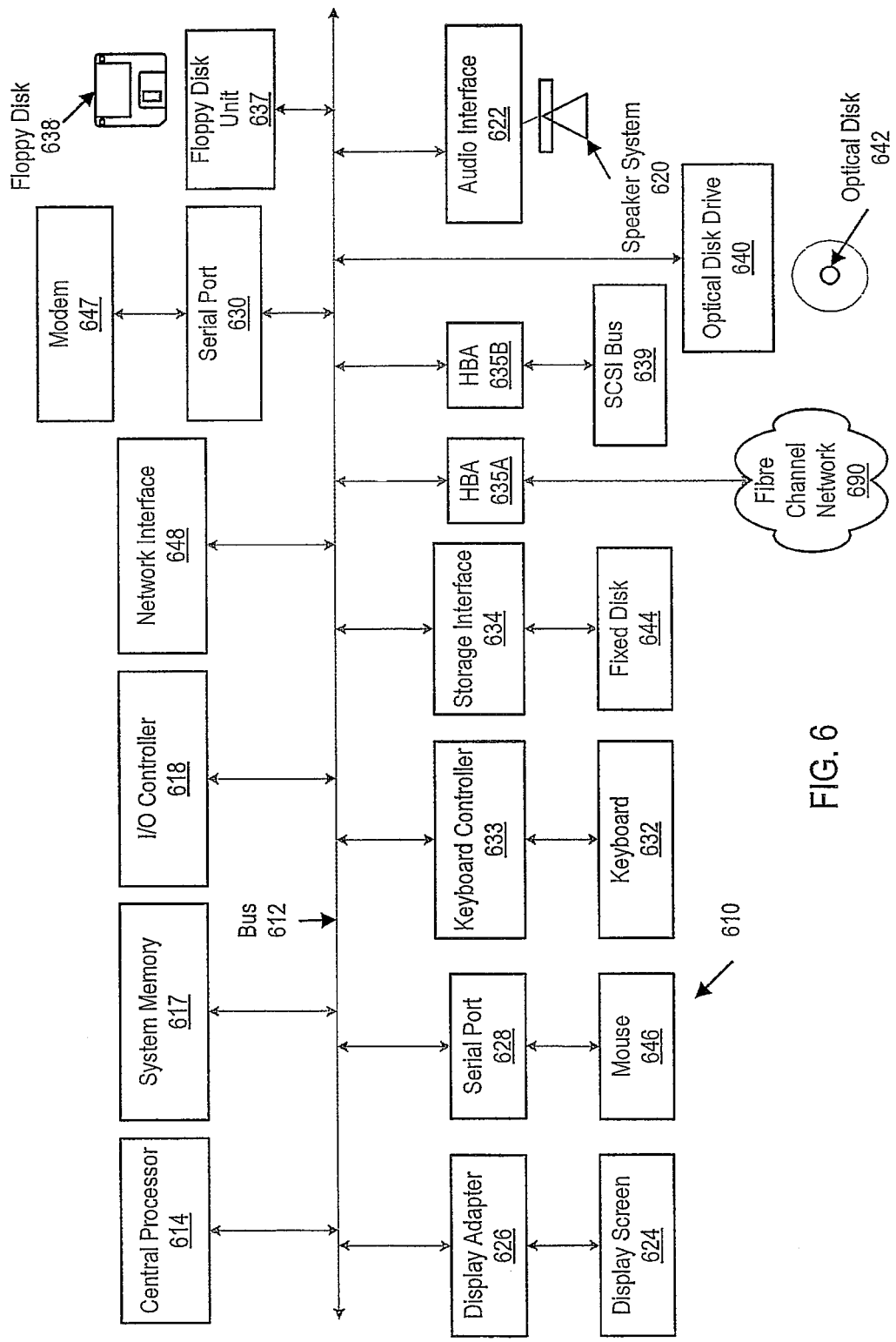
FIG. 6 is a block diagram of a computer usable to implement one embodiment.

FIG. 6 is a block diagram of a computer usable to implement one embodiment. FIG. 6 depicts a block diagram of a computer system 610 suitable for implementing either of computer system 110 or backup server 112 of FIG. 1. Computer system 610 includes a bus 612, which interconnects major subsystems of computer system 610, such as a central processor 614, a system memory 617 (typically random-access memory (RAM), but which may also include read-only memory (ROM), flash ROM, or the like), an input/output controller 618, an external audio device, such as speaker system 620 via an audio output interface 622, an external device, such as a display screen 624 via display adapter 626, serial ports 628 and 630, a keyboard 632 (interfaced with keyboard controller 633), a storage interface 634, a floppy disk drive 637 operative to receive a floppy disk 638, a host bus adapter (HBA) interface card 635A operative to connect with a Fibre Channel network 690, a host bust adapter (HBA) interface card 635B operative to connect to a SCSI bus 639, and an optical disk drive 640 operative to receive an optical disk 642.

Also included are a mouse 646 (or other point-and-click device, coupled to bus 612 via serial port 628), a modem 647 (coupled to bus 612 via serial port 630), and a network interface 648 (coupled directly to bus 612). Bus 612 allows data communication between central processor 614 and system memory 617, which may include read-only memory (ROM) or flash memory (neither shown) and random access memory (RAM) (not shown), as previously noted. RAM is generally the main memory into which OS and application programs are loaded, such as backup application 150 and virtual machine manager 118 of FIG. 1. ROM or flash memory can contain, among other code, the Basic Input-Output system (BIOS) which controls basic hardware operation such as the interaction with peripheral components. Applications resident with computer system 610 are generally stored on and accessed via a computer-readable storage medium, such as hard disk drive (e.g., fixed disk 644), an optical drive (e.g., optical drive 640), a floppy disk unit 637, or other computer-readable storage media.

Storage interface 634, as with other storage interfaces of computer system 610, can connect to a standard computer-readable storage medium for storage and/or retrieval of information, such as a fixed disk drive 644. Fixed disk drive 644 may be a part of computer system 610, or may be separate and accessed through other interface systems. Modem 647 can be employed to provide a direct connection to a remote server via a telephone link or to the Internet via an internet service provider (ISP). Network interface 648 may provide a direct connection to a remote server via a direct network link to the Internet via a point-of-presence (POP). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present. The devices and subsystems can be interconnected in different ways from that shown in FIG. 6.

The operation of the computer system such as that shown in FIG. 6 is readily known in the art and is not discussed in detail in this application. Code to implement the previously-described features can be stored in computer-readable storage media such as one or more of system memory 617, fixed disk 644, optical disk 642, or floppy disk 638. The OS provided on computer system 610 can be, for example, MS-DOS®, MS-WINDOWS®, OS/2®, UNIX®, Linux®, or other known OS.

As an example implementation of computer system 610, computer system 110 can store all of virtual machine manager 118 and virtual machines 116a-116n in computer-readable storage media (e.g., memory 617 and the like). Also, network interface 648 may be used by computer system 110 to communicate with backup server 112 across network 114. For example, backup application 150 can send and receive data and instructions concerning functions discussed within computer system 110 across network 114.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

What is claimed is:

1. A method for use in a computing system, the method comprising:

receiving a request to create a point in time copy of a set of data, wherein the point in time copy comprises a base image of the set of data and additional data corresponding to transactions targeted to the set of data which are received during creation of the point in time copy, wherein the transactions are not yet applied to the base image;

determining a subset of the additional data usable to generate a consistent view of the set of data from the base image;

creating a file that comprises a set of changes to the base image represented by the subset; and storing the file in association with the base image.

2. The method of claim 1, further comprising:

receiving a request to access a backup of the set of data;

responsive to the request, generating the consistent view of the set of data by applying a set of changes to the base image represented by the file to a backup of the base image; and simulating access to the backup of the set of data by providing access to the consistent view of the set of data.

3. The method of claim 1, wherein determining the subset comprises:

reading a checkpoint file; and determining from content of the checkpoint file whether a transaction represented by a selected item of the additional data has been written to the set of data.

4. The method of claim 1, wherein the simulating access to the backup of the set of data further comprises delivering a database entry from a database represented by the set of data.

5. The method of claim 1, wherein creating the file further comprises blocking a write, recording the write, and recording the location to which the write was directed.

6. The method of claim 1, wherein applying the set of changes to the base image represented by the file to the backup of the base image further comprises determining the relevant writes of the file by examining a list representing the subset.

7. The method of claim 1, wherein a time of the consistent view can be altered by applying from a second file to the backup of the base image a second set of changes representing a second subset of the additional data.

8. The method of claim 1, further comprising confirming that the transactions corresponding to the subset of the additional data have been performed by reading the file.

9. A non-transitory computer readable storage medium comprising program instructions, wherein when executed the program instructions are operable to:

receiving a request to create a point in time copy of a set of data, wherein the point in time copy comprises a base image of the set of data and additional data corresponding to transactions targeted to the set of data which are received during creation of the point in time copy, wherein the transactions are not yet applied to the base image;

determine a subset of the additional data usable to generate a consistent view of the set of data from the base image;

create a file that comprises a set of changes to the base image represented by the subset; and store the file in association with the base image.

10. The computer readable storage medium of claim 9, wherein when executed the program instructions are further operable to:

receive a request to access a backup of the set of data;

responsive to the request, generate the consistent view of the set of data by applying a set of changes to the base image represented by the file to a backup of the base image; and simulate access to the backup of the set of data by providing access to the consistent view of the set of data.

11. The computer readable storage medium of claim 9, wherein the instructions operable to determine the subset further comprise instructions operable to:

read a checkpoint file, and determine from content of the checkpoint file whether a transaction represented by a selected item of the additional data has been written to the set of data.

12. The computer readable storage medium of claim 9, wherein the instructions operable to simulate the access to the backup of the set of data further comprise instructions operable to deliver a database entry from a database represented by the set of data.

13. The computer readable storage medium of claim 9, wherein the instructions operable to create the file further comprise instructions operable to block a write, record the write, and record the location to which the write was directed.

14. The computer readable storage medium of claim 9, wherein the instructions operable to apply the set of changes to the base image represented by the file to the backup of the base image further comprise instructions operable to determine the relevant writes of the file by examining a list representing the subset.

15. The computer readable storage medium of claim 9, wherein a time of the consistent view can be altered by applying from a second file to the backup of the base image a second set of changes representing a second subset of the additional data.

16. A system comprising:

a backup application configured to:

receive a request to create a point in time copy of a set of data, wherein the point in time copy comprises a base image of the set of data and additional data corresponding to transactions targeted to the set of data which are received during creation of the point in time copy, wherein the transactions are not yet applied to the base image;

determine a subset of the additional data usable to generate a consistent view of the set of data from the base image; and create a file that comprises a set of changes to the base image represented by the subset;

a storage server configured to store the file in association with the base image.

17. The system of claim 16, wherein the backup application is further configured to:

receive a request to access a backup of the set of data;

responsive to the request, generate the consistent view of the set of data by applying a set of changes to the base image represented by the file to a backup of the base image; and simulate access to the backup of the set of data by providing access to the consistent view of the set of data.

18. The system of claim 16, wherein the backup application is further configured to:

read a checkpoint file; and determine from content of the checkpoint file whether a transaction represented by a selected item of the additional data has been written to the set of data.

19. The system of claim 16, wherein the backup application is further configurable to deliver a database entry from a database represented by the set of data.

20. The system of claim 16, wherein the backup application is further configurable to block a write, record the write, and record the location to which the write was directed.

\* \* \* \* \*